United States Patent [19]

Rasor et al.

[11] 4,030,647
[45] June 21, 1977

[54] VEHICLE ACCESSORY RACK

[75] Inventors: William A. Rasor, Birmingham; Walter S. Van Dine, Lexington; Frank A. Whitney, Algonac, all of Mich.

[73] Assignee: Masco Corporation, Taylor, Mich.

[22] Filed: May 22, 1975

[21] Appl. No.: 579,928

[52] U.S. Cl. .................. 224/29 R; 224/42.1 D
[51] Int. Cl.² ................................. B60R 9/06
[58] Field of Search ....... 224/29 R, 42.1 D, 42.1 E, 224/42.1 F, 42.1 R, 42.1 B, 42.1 G; 403/141, 142, 143; 248/188.3; 308/72

[56] References Cited

UNITED STATES PATENTS

| 2,507,108 | 5/1950 | Lange | 403/143 X |
| 2,890,852 | 6/1959 | Bradley | 224/42.1 E X |
| 3,215,323 | 11/1965 | Bonitt | 224/29 R |
| 3,719,313 | 3/1973 | Tischler | 224/42.1 D |

FOREIGN PATENTS OR APPLICATIONS

| 1,212,430 | 12/1961 | Germany | 224/42.1 R |
| 502,494 | 3/1929 | United Kingdom | 224/42.1 F |
| 858,838 | 1/1961 | United Kingdom | 224/42.1 E |

Primary Examiner—Robert J. Spar
Assistant Examiner—Randolph A. Reese
Attorney, Agent, or Firm—E. Dennis O'Connor

[57] ABSTRACT

An auto accessory rack adapted to be mounted on the rear deck, roof or other vehicle outer surface. The rack includes a generally rectangular frame from which extend, at the corners of the frame, shafts ending in convex ball portions. These ball portions are received by socket members in a snap-in relationship to form a ball and socket universal joint. The socket members, formed from non-metallic, resiliently deformable material, include a base portion adapted to rest on the vehicle outer surface. Outer brackets overlie the socket members and engage the ball portions to retain them in the socket members. Fasteners secure the outer bracket and socket members to the vehicle outer surface with the socket member bases insulating the brackets from the vehicle surface and providing a weathertight seal between the rack and the vehicle surface.

2 Claims, 5 Drawing Figures

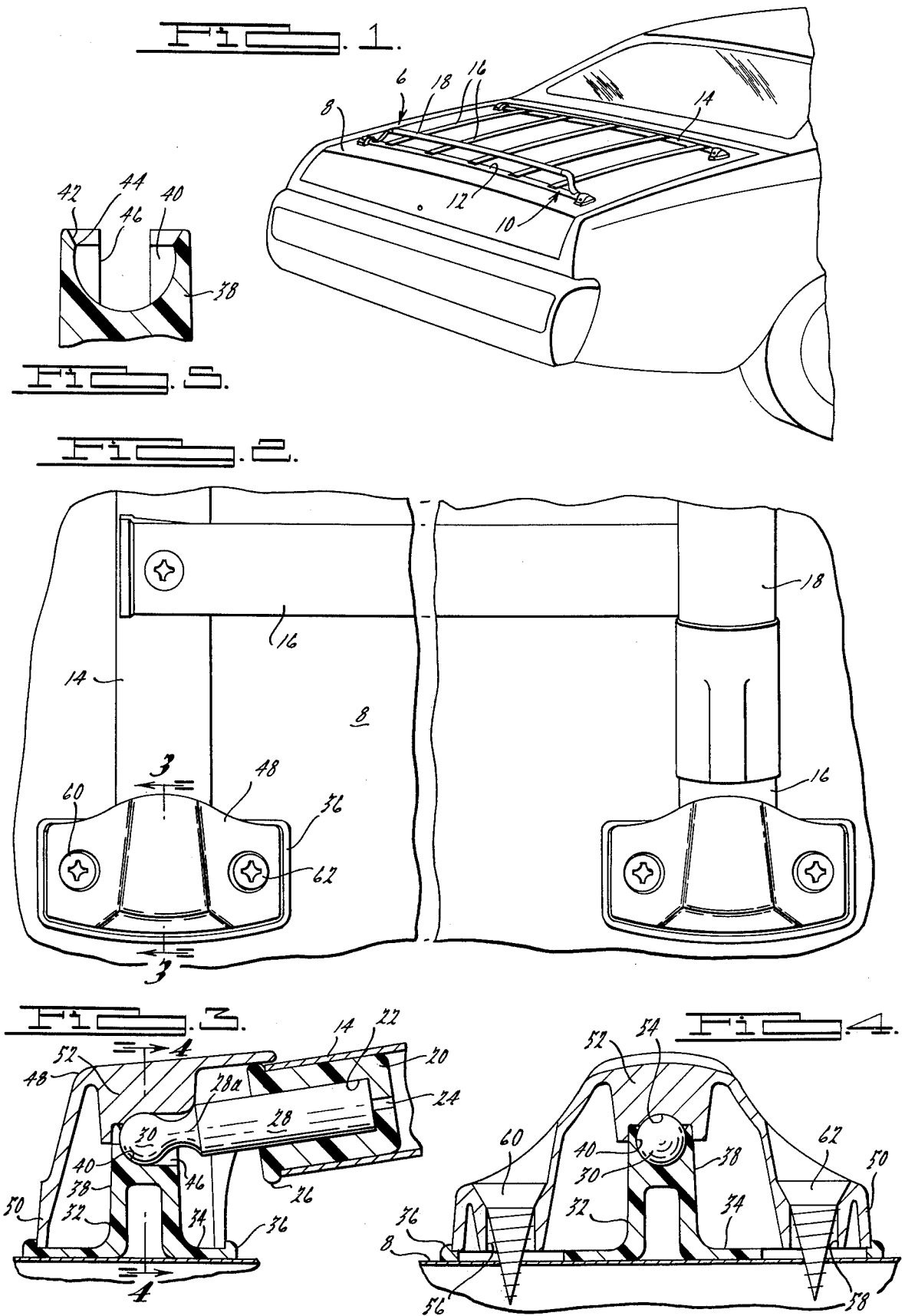

VEHICLE ACCESSORY RACK

BACKGROUND OF THE INVENTION

Racks designed to be mounted on the outer surfaces of vehicles to aid in the carrying of luggage and other materials have proven popular with the vehicle owning public. This popularity appears to have increased with the purchase by the public of greater numbers of so-called "compact" and "subcompact" autos having greatly restricted storage space within the vehicle. However, such racks also commonly are used on vans, station wagons and other types of vehicles.

Because of the large scope of usage of such racks, it is desirable from a manufacturing standpoint to provide a rack having a design that permits rack mounting to vehicle outer panels having widely varying contours. Such designs are known and commonly include the provision of a universal joint or pivotal connection between the rack main body and the rack structure actually secured to the vehicle panel to provide firm and stable seating of the rack on variously curved surfaces. An example of such a design may be seen in U.S. Pat. No. 3,215,323, issued Nov. 2, 1965. To the best of our knowledge, however, prior art racks having universal mounting features have not provided for permanent, secure mounting to the vehicle, ease of mounting and simplicity of design and manufacture.

It is, therefore, an object of this invention to provide a rack for use as a motor vehicle accessory that may be mounted on vehicle panels of varying contours and that allows simple and easy mounting in a permanent manner. Another object of this invention is to provide a rack that, despite its permanent mounting to the vehicle, provides weathertight seals and anti-corrosion features at the mounting location without resort to numerous parts such as gaskets or seals. A still further object of this invention is to provide a rack having a simple design that allows high quality of manufacture coupled with economical manufacturing procedures.

SUMMARY OF THE INVENTION

An automotive accessory rack according to this invention is adapted to be secured to the outer surface of a motor vehicle. The rack comprises a generally rectangular frame having a plurality of convex joint members extending therefrom. A plurality of socket members, each being resiliently deformable, receive the convex joint members in a snap-in relationship that provides for the attachment of the convex joint and socket members as a ball and socket joint permitting limited universal relative movement between these members. A bracket engages a portion of each of the convex joint members and retains each of the convex joint members in a socket member. Fastening means extend through the bracket means and socket members to secure the rack to the vehicle.

DESCRIPTION OF THE DRAWINGS

FIG. 1 is an isometric view of a portion of a motor vehicle upon which is mounted a rack according to this invention;

FIG. 2 is a partial plan view of the rack of FIG. 1;

FIG. 3 is a partial sectional view taken along the line 3—3 of FIG. 2;

FIG. 4 is a sectional view taken along the line 4—4 of FIG. 3; and

FIG. 5 is an enlarged partial sectional view of the socket member of the rack of this invention.

DETAILED DESCRIPTION OF THE INVENTION

Referring now in detail to the drawings, and in particular to FIGS. 1 and 2, the numeral 6 denotes generally a rack constructed in accordance with this invention that is mounted on the rear deck or trunk lid 8 of a motor vehicle. (It should be understood that the rack 6 of this invention may be mounted on any suitable outer body panel of a vehicle such as the roof panel.) This rack has a generally rectangular, planar frame 10 consisting of spaced apart hollow rails 12 and 14 interconnected by a plurality of cross members 16 secured to the rails by suitable fastening means. A raised strut 18 is secured at its ends to rail 16 and extends parallel to rail 16. This raised strut facilitates the securing or tying down of luggage or other cargo supported by rack 6.

The structure securing the rack 6 at each of its four corners to vehicle body 8 is identical so that the structure at only one of these corners will be described in detail herein.

As may be seen from FIG. 3, side rail 14 is hollow and telescopically receives a plastic plug 20. This plug is slightly larger than the hollow interior of rail 14 and has a central bore 22 having a portion of reduced area 24 at its interior end. This bore in plug 20 allows the plug to be slightly deformed radially inwardly and received in a tight fit in rail 14. The end of plug 20 remote from reduced bore 24 is formed with a radially extending shoulder 26 that limits movement of the plug into side rail 14.

A ball shaft 28 is tightly received in plug bore 22 and has formed at its outer end a spherical ball portion 30.

An inner bracket 32, which may be injection molded from a resiliently deformable plastic material such as polypropylene, is formed with a generally flat base 32 having a raised rib projecting therefrom about its entire periphery. A post 38 projects upwardly from base 34 and has formed at the top thereof an upwardly open socket 40 having a partially spherical contour. The open top of the socket 40 has a tapered entrance portion 42 (FIG. 5) that terminates in a shoulder 44 immediately adjacent the spherically contoured socket portion. A slot 46 FIG. 3) is formed in the socket side wall.

Ball 30 and socket 40 are dimensioned such that the diameter of ball 30 is slightly larger than the diameter of socket 38 at shoulder 44. Since the material of inner bracket 32 is resiliently deformable, this arrangement provides that ball 30 may be snapped into socket 40 from the top with the transition portion 28a of ball shaft 28 extending out of the socket through slot 46. A ball and socket connection allowing limited universal movement thus is provided. This connection allows the generally flat bases 34 of the four inner brackets 32 to be firmly seated on vehicle body panels having various contours.

An outer bracket 48 overlies the inner bracket 32 and has a base 50 dimensioned to abut the inner side wall of rib 36 about the periphery of base 50. A downwardly extending projection 52 of outer bracket 48 terminates in a spherically concave recess 54 that receives a portion of ball 30 when the outer bracket 48 rests upon the inner bracket base 34. A pair of apertures 56 and 58 are formed through outer bracket 48. Fasteners 60 and 62, respectively, pass through these apertures, through corresponding apertures in inner bracket base 34 and engage vehicle body panel 8 to secure the rack to the vehicle.

It readily may be appreciated that with outer bracket 48 secured to vehicle panel 8 as illustrated, ball 30 is held securely in socket 40 by projection 52 and secure and permanent mounting of rack 6 is accomplished. Also, it is important to note that outer bracket 48, which desirably may be formed as a chrome plated, zinc die casting, is separated from the material of panel 8 (commonly steel sheet) by non-metallic, resiliently deformable inner bracket 32. This arrangement provides a weathertight seal around the fastener openings through panel 8 and electrical insulation between the materials of rack parts 48 and 8 to prevent the establishment of an electrolytic cell and possible corrosion. In order to further guard against corrosion, it is desirable that screw fasteners 60 and 62 be of the type having screw threads coated with wax.

Another advantage of the bracket arrangement described above is that the upper bracket portion proximate rack 6 comprises a projecting extension that overlies and bears on the upper surface of the flange 26 which is, as readily may be seen from FIG. 3 of the drawing, a portion of the rectangular frame. The advantages of this arrangement readily may be appreciated relative to the damping of vibrations in the frame and the increased resistance to upward movement of the frame due to forces, such as those generated by wind, which would have a tendency to create looseness in the interrelated mounting parts.

The rack 6 described above may be installed quite simply by one having no specialized training or mechanical skill. The rack frame 10, having plug 20 and ball shafts 28 positioned therein as illustrated in FIG. 3, first is attached to the four inner brackets 32 by snapping balls 30 into sockets 40. The rack frame then is placed at the desired position on the motor vehicle outer surface, the ball and socket connection described above automatically compensating for the particular body panel contour. Outer brackets 48 then are placed on the inner bracket bases 34 as illustrated and appropriate holes for fasteners 60 and 62 either drilled through openings 56 and 58 or marked for subsequent drilling. After the drilling is completed, the fasteners are inserted and the rack 6 is permanently mounted.

It thus may be seen that rack 6 of this invention is a motor vehicle accessory that may be mounted on vehicle panels of varying contours in a permanent manner by a simple and easy operation. Furthermore, weathertight seals above fastener openings and anti-corrosion features are provided without resort to a multiplicity of parts such as gaskets and seals. Still further, it readily is apparent that the rack of this invention consists of relatively few parts of simple design and ease of manufacture as may be seen from the fact that inner bracket 32 is a plastic injection molding that performs multiple functions in the rack assembly.

We claim:

1. A rack adapted to be secured to the outer surface of a motor vehicle, said rack comprising a generally rectangular frame, a plurality of convex joint members extending from said frame, a plurality of socket members, each of said socket members being resiliently deformable and receiving one of said convex members in a snap-in relationship providing the attachment of said convex and socket members as a ball and socket joint and permitting limited universal relative movement between said members, a rigid bracket means having a partially concave portion engaging a portion of each of said convex members and retaining each of said convex members in one of said socket members, fastening means extending through said bracket means and socket members for securing said rack to said outer surface, said rigid bracket means including a portion thereof bearing against the upper surface of said frame thereby preventing upward movement thereof.

2. The rack of claim 1 wherein said socket members are non-metallic and include base portions resting on said outer surface, engaged by said bracket means and positioned between said bracket means and said outer surface when said rack is secured to said outer surface by said fastener means.

* * * * *